Figure 1:
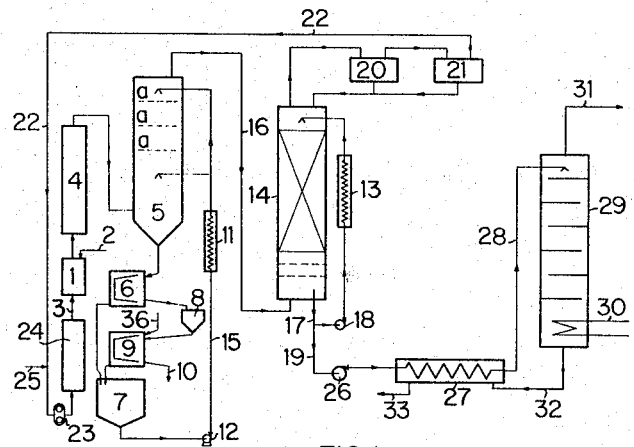

March 21, 1967  A. P. OELE ET AL  3,310,558

MELAMINE RECOVERY

Filed March 7, 1963

3,310,558
MELAMINE RECOVERY

Adriaan P. Oele, Gerardus J. J. M. Taks, and Simon Dingemans, Geleen, and Jan Damme, Beek, Netherlands, assignors to Stamicarbon N.V., Heerlen, Netherlands
Filed Mar. 7, 1963, Ser. No. 263,485
Claims priority, application Netherlands, Mar. 8, 1962, 275,724; Nov. 28, 1962, 286,072
6 Claims. (Cl. 260—249.7)

In the preparation of melamine from urea, or from products obtained by thermal decomposition of urea, e.g. biuret, by heating these substances at a temperature of 300–450° C. in the presence of ammonia whilst they are in contact with a catalyst, e.g. silica gel, aluminum oxide or aluminum phosphate, a hot, melamine-containing gas mixture is obtained which, in addition to melamine, contains large amounts of ammonia and carbon dioxide.

In addition to 1.0 to 3.0% by volume of melamine, these melamine-carrying gas mixtures contain for instance 3–7% by volume of $CO_2$ and 96–90% by volume of $NH_3$.

The simplest known method for recovering melamine from these mixtures consists in cooling the gas mixture by passing it along cooled surfaces, as a result of which melamine desublimates, after which the solid melamine particles are separated from the remaining gas flow in a known manner.

This type of process has the drawback that part of the desublimated melamine deposits as a hard crust on the cooled surfaces of the cooler and has to be periodically removed therefrom with the aid of mechanical ancillary equipment, such as scrapers, or by dissolving it in hot water.

It is also known that the melamine-containing gas flow can be cooled by bringing it into direct contact with a cold, inert liquid, e.g. a high-boiling hydrocarbon, as a result of which a suspension of melamine in the said liquid is formed. The melamine can be recovered therefrom by filtration or centrifugation. This process has the drawback that the melamine is contaminated with adhering inert liquid.

It has furthermore been suggested to absorb the whole hot, melamine-containing gas mixture in water, and to recover the melamine from the resulting solution by crystallization.

This procedure is expensive because the ammonia, which has also dissolved, has to be recovered by desorption of the solution, for which treatment a large amount of steam is needed.

The process according to the invention obviates the drawbacks attached to the known processes.

In the process according to the invention use is made of the cooling effect of evaporating water to which virtually no heat is supplied. The process can be carried out both at atmospheric and higher pressures.

According to the invention, the hot, melamine-containing gas mixture is introduced into a cooling zone, and brought into direct contact with an amount of water which can be considered rather constant; as a result, the gas mixture cools down whilst delivering heat of evaporation, in consequence of which the melamine separates from the gas mixture and the latter absorbs water vapour.

Depending on the temperature, the pressure and the melamine concentration in the coolant, the melamine is discharged from the cooling zone as an aqueous suspension, or as a solution. A quantity of water equivalent to the amount discharged from the cooling zone—either in the form of water vapour, or in the form of liquid entrained by the melamine—is continuously supplied to the cooling zone.

In this process an equilibrium establishes after a short period of time, as a result of which the cooling liquid becomes saturated with ammonia and carbon dioxide and, consequently, does not absorb any more ammonia or carbon dioxide from the infed melamine-containing gas mixture.

Consequently, the process according to the invention offers the following advantages:

(a) The recovered melamine is not contamined with foreign cooling liquid; adhering water can be completely removed by drying;

(b) During recovery of the melamine from the hot gas mixture hardly any ammonia is absorbed by the coolant. Consequently, no expenses need be incurred for desorption of absorbed ammonia.

As it is not very well possible in practice to effect cooling by evaporation under strictly adiabatic conditions, and the amount of coolant to be supplied to the cooling zone to make up for the amounts of coolant discharged from the said zone is subject to fluctuations so that a small amount of ammonia may still be absorbed, the invention is not confined to a process in which no ammonia is absorbed by the coolant, but must also cover a process in which a small amount, e.g. at most 10%, of the ammonia contacted with the coolant is absorbed.

The claims consequently cover a process for recovering melamine from a hot, melamine-containing gas mixture which, besides the melamine, contains mainly ammonia and carbon dioxide, in which process the gas mixture is cooled in direct contact with water in a cooling zone, and the melamine separates from the gas mixture and is discharged from the cooling zone, the said process being characterized in that cooling is effected by contact with a virtually constant amount of water, predominantly by evaporation of a portion of this water, and an amount of water is supplied that is equivalent to the amount lost by evaporation and by entrainment with the melamine discharged from the cooling zone, the gas mixture discharged from the cooling zone still containing at least 90% of the amount of ammonia supplied.

Using this method of cooling the hot, melamine-containing gas mixture, the gas mixture generally reaches a temperature of 70–90° C. at atmospheric pressure; at higher pressures the temperature rises in proportion to the pressure. If, for some reason or other, the temperature should drop below this level, measures will have to be taken to raise the temperature again, for instance by supplying extra heat to the cooling zone, as otherwise the danger will arise that, besides solid melamine particles, solid compounds of ammonia and carbon dioxide, such as ammonium carbonate, ammonium bicarbonate, ammonium carbamate or mixtures thereof, will also separate off.

For contacting the hot, melamine-containing solution with the solution containing $NH_3$ and $CO_2$ use is made, for example, of a gas scrubber through which the hot gas mixture and the solution containing $NH_3$ and $CO_2$ are passed in countercurrent relation to each other. In the base of the gas scrubber the hot gas mixture is then cooled to such a degree that solid melamine particles of the order of 10–50$\mu$ separate off; initially, these solid particles are entrained by the gas flow, but gradually they get caught by the descending solution and are discharged from the base of the gas scrubber.

The gas mixture escaping from the top of the gas scrubber is virtually free of melamine and, compared with the original gas mixture, contains a large amount of evaporated water.

To effect the recovery of the solid melamine particles from the gas flow by means of the descending liquid as quickly and completely as possible, the gas scrubber is provided with one or more irrigated contacting members.

It is advantageous to cool the hot melamine-containing gas mixture in two stages, i.e. a first stage where the hot gas mixture is fed through a primary cooling zone in concurrent relation to the coolant flowing along the inner wall of the said cooling zone and where it gives off a large portion of its melamine, and a second stage where the separation is completed by leading the precooled gas through a second cooling zone in countercurrent relation to the coolant.

As a result of this two-stage cooling treatment, the hot gas is cooled at a slower rate; this less rapid cooling results in removal of larger melamine particles. A considerable portion of these particles are in the size range 50–150$\mu$, whereas the paticles obtained in the process where cooling is effected in a single stage were in the size range 10–50$\mu$.

In this way practically all of the melamine could be recovered. The gas discharged from the second cooling zone contained less than 0.05% of the original amount of melamine.

Figure 2:
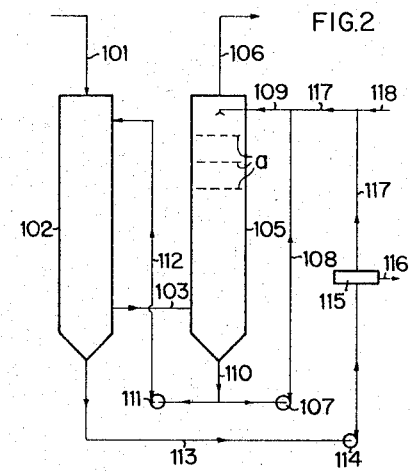

The process according to the invention is schematically shown in the attached FIGURES 1 and 2; FIG. 1 also illustrates the procedures for recovering ammonia from the gas mixture that has been freed of melamine, and for desorbing $NH_3$ and $CO_2$ from the resulting solution; FIG. 2 relates to the two stage cooling of the hot melamine-containing gas mixture.

Using the system represented in the diagram, a stream of, say, urea or biuret, whether in the solid or in the molten state, is fed to a fluidized bed reactor 1 via conduit 2.

Gaseous $NH_3$, serving as carrier gas for the bed of a suitable catalyst (e.g. silicagel, aluminum oxide, aluminum phosphate or boron phosphate) present in reactor 1, is supplied through conduit 3. The fluidized bed reactor is kept at a temperature of 350° C. The gases issuing from reactor 1 are passed through a fixed-bed reactor 4 filled with a catalyst from the above-mentioned series. In this reactor the melamine synthesis is completed; the gas mixture issuing from reactor 4, being composed for instance of 92% by volume of $NH_3$, 6% by volume of $CO_2$ and 2% by volume of melamine and having a temperature of 330° C., is fed to the base of the gas scrubber 5, equipped with baffle plates a, where the gas mixture comes in contact, in countercurrent relation, with solution containing ammonia and carbon dioxide supplied via conduit 15 by pump 12. By evaporation of water from this solution, the infed gas mixture cools down with simultaneous absorption of water vapour. The losses of water due to evaporation are made up by supplying water to the liquid circuit via conduit 36.

The melamine suspension formed in gas scrubber 5 is fed to the centrifuge thickener 6; the solution freed of solid melamine flows to reservoir 7, to be fed back to gas scrubber 5 via pump 12 and conduit 15.

The concentrated melamine suspension discharged from centrifuge thickener 6 is fed to centrifuge 9 via a buffer tank 8; after being washed with wash-water supplied via conduit 36, the melamine cake formed in this centrifuge is removed from the system via conduit 10. The liquids recovered in centrifuge 9 are drained into reservoir 7.

Conduit 15 is equipped with a heater 11 in which the temperature of the solution flowing through conduit 15 can be increased if this should be necessary to enusre proper functioning of the system.

The melamine-free gas mixture issuing from the top of gas scrubber 5, and containing for instance 71.5% by volume of $NH_3$, 4.6% by volume of $CO_2$ and 23.8% by volume of $H_2O$, is fed to the base of absorption column 14 via conduit 16. This column is equipped with plates and/or filling bodies to promote the contact between the absorbing liquid and the gas to be absorbed. The absorbing liquid continuously circulates through the column via conduit 17, pump 18 and cooler 13. The heat released during the absorption of virtually all of the carbon dioxide and part of the ammonia from the infed gas mixture is carried off in cooler 13.

The solution freshly formed in the absorption stage owing to the dissolution of $CO_2$ and $NH_3$ and the condensation of water vapour, is continuously drained off via conduit 19.

The gas mixture issuing from the top of the absorption column and containing for instance 93% by volume of $NH_3$, 6¼% by volume of $H_2O$ and ¾% by volume of $CO_2$, is successively cooled in condensers 20 and 21 to 15° C. and −6° C. respectively; the gaseous ammonia, which has thus been freed of substantially all $CO_2$ and water vapour, is fed back to reactor 1 via conduit 22, fan 23 and heater 24. Additional ammonia gas may be supplied via conduit 25.

The condensates formed in the condensers 20 and 21 flow into absorption column 14.

The solution discharged via ventline 19, which consists of, for instance, 53 mol. percent of $H_2O$, 37 mol. percent $NH_3$ and 10 mol. percent of $CO_2$, can be freed of the dissolved ammonia and carbon dioxide by desorption. If these gases are to be used in, for instance, the urea synthesis, the drained-off solution can be compressed to about 18 atm. by means of compressor 26, and, after that, be fed to the top of a desorption column 29 via heat exchanger 27 and conduit 28. The necessary heat of desorption is supplied to the base of this column by a steam-fed heater 30. The desorbed gases issue from the top of the column via conduit 31, whence they can be fed to the first pressure stage of a recirculation system (not shown in the drawing) of a urea plant. The liquid, which is now free of $NH_3$ and $CO_2$—so, virtually pure water— is discharged from the column base via conduit 32, heat exchanger 27 and conduit 33. If desired, this water may be used for washing the melamine separated off in centrifuge 9. For an hourly production of about 1250 kg. of melamine, 4000 kg. of urea are required, and about 30 m.³ of a solution containing for instance 11.5% by weight of $NH_3$, 6.2% by weight of $CO_2$ and 1.7% by weight of melamine have to be circulated through gas scrubber 5.

In that case about 270 m.³ of absorption liquid/hour circulate through absorption column 14.

The cooling of the hot melamine-containing gas mixture in two stages, i.e. a primary cooling in concurrent relation to the coolant and a secondary cooling in countercurrent relation to the coolant, is represented in FIGURE 2; as shown here, the hot synthesis gas containing melamine vapour is supplied to the first cooling zone, consisting of a cylindrical cooler 102, via conduit 101; the gas is cooled by the solution containing aqueous ammonia and carbon dioxide which, being supplied through conduit 112, flows down as a film along the inner wall of cooler 102.

The precooled gas, which has already given off, say, appr. 80% of its total melamine, flows through conduit 103 to the second cooling zone, consisting of a cylindrical scrubber 105 in the upper part of which baffle plates are mounted. Here, the gas is scrubbed in countercurrent relation to an aqueous solution recycling via conduit 110, pump 107, conduit 108 and conduit 109. The gas, which is then substantially free of melamine, is discharged along conduit 106. From scrubber 105 a portion of the wash liquid is fed to cooler 102 via conduit 110, pump 111 and conduit 112. The resulting melamine suspension is drained from the base of scrubber 102 and supplied to the separation plant, a filter, cyclone or centrifuge 115, via conduit 113 and pump 114.

The separated melamine is discharged via conduit 116, the mother liquid being returned to cooler 102 or 105 via conduit 117. An amount of water approximately equivalent to the amount evaporated during cooling and discharged along with the melamine-free gas via conduit 106, is supplied via conduit 118.

We claim:

1. In a process for recovering melamine from a hot melamine containing gaseous mixture which in addition to melamine contains mainly ammonia and carbon dioxide, in which process the gaseous mixture is cooled by direct contact with water in a cooling zone and the melamine separates from the gaseous mixture and is discharged from the cooling zone, the improvement comprising the steps of:

using as the gaseous mixture one consisting essentially of melamine, ammonia and carbon dioxide;

first cooling the hot gaseous mixture by passing the gaseous mixture into a first cooling zone, the inner surface of which is cooled in concurrent relation to the gaseous mixture with a coolant consisting essentially of cooling water which is substantially saturated with ammonia and carbon dioxide whereby said gaseous mixture is cooled by the evaporation of water from the coolant and a large portion of the melamine is condensed and separates from the gaseous mixture;

then passing the coolant into a second cooling zone and passing the precooled gaseous mixture through the second cooling zone in countercurrent relation to the coolant while directly contacting the precooled gaseous mixture with the coolant, cooling of the gaseous mixture being effected by contact with a virtually constant amount of water, predominantly by evaporation of this water, whereby the condensation and separation of melamine from the gaseous mixture is completed;

discharging the separated melamine from the first cooling zone and separately discharging the remainder of the gaseous mixture including evaporated water;

and supplying additional cooling water to the coolant in an amount equivalent to the amount of water removed from the coolant by the evaporation of water and entrainment with the melamine and gaseous mixture discharged from the cooling zones whereby the amount of cooling water in the coolant is maintained substantially constant and the gaseous mixture discharged from the cooling zones contains at least 90% of the amount of the ammonia originally present in the gaseous mixture fed to the cooling zones.

2. The process of claim 1 wherein the gaseous mixture discharged from the cooling zones is subjected to an ammonia-carbon dioxide separation, and the resulting ammonia gas, which is virtually free of carbon dioxide and water is recycled to the cooling zones and fed in, together with the hot melamine containing gaseous mixture.

3. The process of claim 1 wherein ammonia gas, substantially free from carbon dioxide and water vapor, is recovered from the gaseous mixture discharged from the second cooling zone.

4. The process of claim 1 wherein the hot gaseous mixture of melamine, ammonia and carbon dioxide passed into the first cooling zone is the product obtained from a melamine synthesis and ammonia gas recovered from the gaseous mixture discharged from the second cooling zone is recycled to said synthesis.

5. The process of claim 1 wherein the hot gaseous mixture is cooled in said process at atmospheric pressure to a temperature of 70–90° C.

6. The process of claim 1 wherein melamine is discharged from the first cooling zone with water, solid melamine is thereafter separated from the water discharged therewith and the water is returned to the second cooling zone.

References Cited by the Examiner

UNITED STATES PATENTS

| | | | |
|---|---|---|---|
| 2,755,887 | 7/1956 | Boatright | 260—249.7 X |
| 2,918,467 | 12/1959 | Hibbitts et al. | 260—249.7 |
| 2,950,173 | 8/1960 | Baroni et al. | 260—249.7 X |
| 3,132,143 | 5/1964 | Fogagnolo et al. | 260—249.7 |
| 3,161,638 | 12/1964 | Christoffel et al. | 260—249.7 |

WALTER A. MODANCE, *Primary Examiner.*

NICHOLAS S. RIZZO, *Examiner.*

M. W. WESTERN, J. M. FORD, *Assistant Examiners.*